3,793,295
CATALYSTS FOR THE POLYMERIZATION OF OLEFINS

Luciano Luciani, Gianni Nava, and Giorgio Foschini, Ferrara, Italy, assignors to Montecatini Edison S.p.A., Milan, Italy
No Drawing. Filed Dec. 21, 1970, Ser. No. 100,353
Claims priority, application Italy, Dec. 22, 1969, 26,163/69
Int. Cl. B01j *11/84;* C08f *1/56, 3/00*
U.S. Cl. 260—93.7                                    13 Claims

ABSTRACT OF THE DISCLOSURE

New catalysts for the polymerization of olefins are disclosed. The catalysts are prepared by contacting an alcoholic compound containing one or more hydroxy groups with delta titanium trichloride under conditions such that at least 1% and preferably 20%, of the fine powders having a particle size smaller than 20 microns, normally present in the trichloride, disappear, and then mixing the resulting product with an alkyl aluminum compound. Also disclosed is the use of the new catalysts in the polymerization of propylene, butene-1, 4-methylpentene-1 and similar alpha-olefins to highly isotactic polymers characterized by a very narrow granulometric distribution, a low content of fine powders, and a high bulk density.

PRIOR ART

Catalysts for the polymerization of olefins and prepared by mixing alkyl aluminum compounds, particularly dialkyl aluminum monohalides, with delta titanium trichloride obtained by dry-milling alpha- and/or gamma-titanium trichloride are known.

Said catalysts are highly active in the polymerization of the higher alpha-olefins and effect the polymerization stereo-specifically. However, the polymers formed often do not have a very high bulk density and generally comprise a considerable amount of fine powders the particles of which have sizes smaller than 100 microns.

The presence of the fine powders in the polymers produced on an industrial scale, together with relatively low values of the bulk density, can give rise to problems in the processing of the polymers, which problems, if not overcome, result in a reduction in the productivity of the equipment. In fact, the fine powders tend to clog the centrifuges in which the polymer is separated from the polymerization slurry, and impede feeding of the polymer to the drawbenches for granulation.

The difficulties arise, for the most part, from the fact that the delta titanium trichloride used heretofore in preparing the catalysts has a very wide granulometric distribution and a high content, in many cases exceeding 70% or more, of fine powders the particles of which are smaller than 20 microns in size.

Various methods have been proposed for obviating the problems mentioned, with, however, less than satisfactory results.

For instance, it is possible to remove the fine powders by screening the delta TiCl₃, but the coarser fractions thus separated tend to scale, and consequently can again give rise to fine powders.

Moreover, in order to remove the fine powders, it was always proposed (see Belgian Pat. No. 655,308) to prepare the delta TiCl₃ by dry-milling alpha and/or gamma TiCl₃ in the presence of small quantities of ketones or ethers.

The results obtained by that method are not very satisfactory.

According to the Belgian patent it is absolutely necessary to add the ketones or ethers during the milling step, and not after the milling step has been completed.

This is due to the fact that if the ketones or ethers are added after the milling step, the content of particles of fine size is not decreased, but there is a tendency to lowering of both the activity and stereospecificity of the catalyst prepared from the resulting TiCl₃.

The requirement for addition of the ketones or ethers before or during the milling step means that the fine powders will not be removed effectively, since the fine powders are formed continuously during the milling.

Furthermore, both the ketones and ethers, whether used before, during, or after the milling operation, have little or no effect on the bulk density of the polymers obtained.

If the ketones and ethers are used during the activation phase of titanium trichloride they tend to lower the catalytic activity and the product obtained shows a strong tendency to scaling off of the crystalline aggregates which is most apparent during the step of premixing the catalyst-forming components.

THE PRESENT INVENTION

One object of this invention is to provide new catalysts for the polymerization of olefines which avoid many of the above-mentioned problems.

This and other objects are accomplished by the invention which provides new catalysts prepared by mixing.

(a) an alkyl aluminum compound having the formula AlR₃ or R₂AlX, in which R is an alkyl radical containing from 2 to 6 carbon atoms and X is halogen, with (b) the product containing titanium trichloride in the delta crystalline form, said product being obtained by homogenizing an alcoholic compound containing one or more hydroxy groups with a preformed delta titanium trichloride prepared by dry milling alpha and/or gamma TiCl₃, or compositions consisting of alpha and/or gamma TiCl₃ cocrystallized with AlCl₃, or by carrying out the homogenization during the formation of delta titanium trichloride by dry milling alpha and/or gamma trichloride, or compositions consisting of alpha and/or gamma TiCl₃ cocrystallized with AlCl₃, in the presence of the alcoholic compound and in the absence of inert solvents, under conditions such that at least a portion, and preferably 20%, of the fraction of titanium trichloride having a particle size smaller than 20 microns disappears.

The delta crystalline TiCl₃ can be pre-formed by dry-milling alpha and/or gamma TiCl₃, or compositions consisting of alpha and/or gamma TiCl₃ cocrystallized with AlCl₃. Or the delta titanium trichloride may be contacted with the alcoholic compound as it is formed during the milling step.

Representative alcoholic compounds which are suitable for use in practicing the invention include mono- and polyhydric aliphatic alcohols containing from 1 to 10 carbon atoms, such as methanol, ethanol, propanol-1, propanol-2, butanol-1, 2-ethyl-butanol-1, butanol-2, 2-ethyl-hexanol-1, 3-methyl-hexanol-1, 5-methyl-hexanol-2, heptanol-3, pentaerythritol, glycerol, ethylene glycol.

Further examples of suitable alcoholic compounds are furfurol, phenylcarbinol and alpha-alpha'-diisopropyl-benzenediol.

Besides the hydroxy group, the compounds which may be used may contain other organic functions or substituent groups. Examples of these last-mentioned compounds are glycolmonoalkylethers and glycolmonoarylethers such as, for instance, diethyleneglycol-mono-butylether, diethylene-glycol-monophenylether, 4 - hydroxy - 4 - methyl-pentanone-2 (diacetone alcohol), 2,3-dichloropropanol-1 etc.

The catalytic component (b) can be prepared in various ways. The preferred method consists in homogenizing the starting delta titanium trichloride and the alcoholic compound, operating, for instance, in a rotating mill for a period of time and using amounts of alcoholic compound sufficient to obtain the reduction of the content in fine powders of the starting titanium trichloride.

Alternatively, instead of homogenizing the delta TiCl$_3$ and alcoholic compound in the dry state, that is in the absence of solvents the homogenizing may be carried out in an inert solvent such as, for example, the hydrocarbon solvent to be used in the polymerization of the alpha-olefins in contact with the catalyst.

Generally, the homogenizing is carried out at room temperature. However, it is possible to operate also at lower or higher temperatures, taking into consideration that in this latter case, it is not convenient to exceed the temperature of 90°–100° C. above which there is a deterioration of the catalytic properties and stereospecificity of delta titanium trichloride.

The reaction between delta titanium trichloride and the alcoholic compound is an exothermic reaction. It is advisable in some cases, especially when considerable quantities of trichloride are treated, to remove the reaction heat.

Another method for preparing component (b) of these catalysts consists, as has been indicated, in effecting the milling of alpha and/or gamma titanium trichloride to delta trichloride in the presence of the alcoholic compound. This is not the presently preferred method.

The quantity of alcoholic compound used in practicing the invention is, in general, lower than 20% by weight with respect to the starting delta titanium trichloride. Good results were obtained using the alcoholic compound in an amount of from 2 to 10% by weight with respect to the titanium trichloride.

The delta trichloride is obtained by dry-milling of alpha and/or gamma titanium trichloride according to the known methods.

The characteristics of the delta titanium trichloride thus obtained, and those of the corresponding alpha and gamma forms of TiCl$_3$, are described in Journal Polymer Science 51, 389–410 (1961).

Alpha titanium trichloride is obtained, according to the known methods, by the reduction of TiCl$_4$ with hydrogen at high temperatures, or by the reduction of TiCl$_4$ with aluminum. Gamma titanium trichloride is obtained by the reduction of TiCl$_4$ with Al at temperatures lower than 130–140° C. When the reduction is carried out at temperatures ranging from about 140° to 200° C., then mixtures of alpha and gamma titanium trichloride are formed.

Titanium trichloride obtained by the reduction of TiCl$_4$ with aluminum has, in general, the composition 3TiCl$_3$·AlCl$_3$.

Gamma titanium trichloride may be obtained by heating a beta TiCl$_3$ prepared by the reduction of TiCl$_4$ with hydrogen in the presence of silent discharges, at a temperature of 200° C. or higher.

Examples of alkyl aluminum compounds which can be used as component (a) of the present catalysts include:

Al(C$_2$H$_5$)$_3$, Al(n. C$_4$H$_9$)$_3$, Al(n. C$_3$H$_7$)$_3$, Al(C$_2$H$_5$)$_2$Cl, Al(C$_2$H$_5$)$_2$Br, Al(n. C$_3$H$_7$)$_2$Cl, Al$_2$(C$_2$H$_5$)$_3$Cl$_3$.

Selection of the alkyl aluminum compound used depends on the desired or required characteristics of the polymer to be obtained, and on the yield of the polymer.

The catalysts of which component (a) is an aluminum trialkyl are highly active in the polymerization of the higher alpha-olefins but are generally less stereospecific than the catalysts in which component (a) is a dialkyl aluminum halide, and which are highly stereospecific; on the other hand, the latter catalysts are, in general, somewhat less active.

The Al/Ti ratio used in the preparation of the catalyst is generally higher than 1. In the case of the propylene polymerization it is preferably comprised between 1 and 3.

The polymerization of the alpha-olefins with the catalysts of the present invention is carried out according to the known methods, operating in liquid phase, in the presence, or in the absence, of inert diluents, or in the gaseous phase.

The polymerization temperature is generally comprised between −80° and 200° C., preferably between 50 and 100° C. The process is carried out at atmospheric pressure or under pressure.

The molecular weight of the polymer is adjusted according to the known methods, for example by including alkyl halides, hydrogen, Zn-alkyls and similar regulators of the molecular weight in the polymerization zone.

The following examples are given to illustrate the invention and are not intended to be limiting.

Example 1

Into a 4 l. autoclave, provided with a stirrer and containing 1800 ml. of commercial n-heptane dried on sodium hydride were fed 1.1 g. of delta titanium trichloride having the composition 3TiCl$_3$·AlCl$_3$ obtained by the reduction at 150–160° C. of TiCl$_4$ with Al in stochiometric quantity and subsequent transformation of the reduction product into delta TiCl$_3$ by dry milling.

The granulometric distribution curve of titanium trichloride thus obtained shows that 60% of the product consisted of powders having a particle size lower than 20 microns.

4.7 g. of Al(C$_2$H$_5$)$_2$Cl were introduced and the catalyst suspension was then maintained under stirring for 1 hour in order to increase the possible crush of the agglomerates of titanium trichloride. The temperature was then brought to 70° C. Immediately thereafter, a mixture of propylene and hydrogen containing 6.5 Nl. of hydrogen per kg. of propylene was introduced to a total pressure of 5 atms. The propylene pressure was maintained constant by feeding propylene continuously during the polymerization.

After 4 hours, the run was interrupted and the solid product was recovered by cold filtrations, and subsequent stripping with steam and drying in a stove at 60° C., under nitrogen. The isotacticity degree, the bulk density and the granulometric distribution of the polymer obtained were determined and are reported in Table 1 which also contains data relevant to Examples 2–4.

TABLE 1

| Example | Type of additive | Percent on the catalyst | Catalytic activity [1] | Isotacticity index | Granulometric distribution in microns (percent by weight) | | | | | | | Percent in powder, ≤105μ | Apparent density, kg./l. |
|---|---|---|---|---|---|---|---|---|---|---|---|---|---|
| | | | | | ≥1,000 | ≥420 | ≥177 | ≥105 | ≥74 | ≥53 | <53 | | |
| 1 | | | 38 | 91.5 | 12.1 | 20.3 | 18.5 | 16.3 | 13.2 | 11 | 8.6 | 32.8 | 0.48 |
| 2 | Butanol-1 | 5 | 42 | 95 | 11.5 | 20.8 | 26.5 | 18.0 | 6 | 10.2 | 7 | 23.2 | 0.54 |
| 3 | 2-ethyl-hexanol-1 | 6 | 45 | 94.5 | 18 | 24.8 | 32 | 10 | 5.1 | 5.3 | 4.8 | 15.2 | 0.55 |
| 4 | Ethyl-phenyl ether (C$_6$H$_5$—O—C$_2$H$_5$) | 4 | 38 | 93.5 | 0.2 | 4.2 | 31 | 33.4 | 18 | 8.5 | 5.3 | 31.8 | 0.40 |

[1] Catalytic activity expressed in g. polymer/g. 3TiCl$_3$·AlCl$_3$ 1 hr. ata. C$_3^=$.

Example 2

Example 1 was repeated except that 5% by weight of butanol-1 was added to the delta titanium trichloride. The addition and the homogenization of alcohol with the titanium trichloride was carried out in a centrifugal mill of Locke type for 30 minutes. The content in fine powders with a particle size lower than 20 microns, of the delta 3 TiCl$_3$·AlCl$_3$ thus obtained, was 20%.

The results obtained in the polymerization of propylene with a catalyst formed from the TiCl$_3$ are reported in Table 1.

Example 3

Example 1 was repeated, except that titanium trichloride used in this example was treated with 6% by weight of 2-ethyl-hexanol-1. The addition of alcohol was carried out under the conditions of Example 2. The amount of powder having a particle size smaller than 20 microns contained in the product was lower than 18%.

The results obtained by polymerizing propylene with the aid of the catalyst prepared from the treated delta crystalline TiCl are shown in Table 1.

As will be apparent, various changes in details may be made in practicing the invention, without departing from its spirit. Therefore, we intend to include in the scope of the appended claims all such modifications as will be obvious to those skilled in the art from the description and working examples given herein.

TABLE 2

| Example | Type of alcohol added | Percent on the catalyst | Isotacticity index | Granulometric distribution of the polymer in microns (percent by weight) | | | | | | | Percent in in powder (≤105 microns) | Apparent density, kg./l. |
|---|---|---|---|---|---|---|---|---|---|---|---|---|
| | | | | ≥1,000 | ≥420 | ≥177 | ≥105 | ≥74 | ≥53 | ≤53 | | |
| 5 | | | 89 | 1.3 | 17.5 | 30.3 | 13.9 | 8.6 | 8.8 | 19.8 | 37.2 | 0.49 |
| 6 | Isopropanol | 5 | 90.5 | 7 | 24.2 | 30.7 | 13.8 | 5.8 | 4.7 | 13.8 | 24.5 | 0.55 |
| 7 | Isopropanol plus 2-ethylhexanol | 4.5 | 91 | 6.3 | 19.00 | 40.8 | 14.1 | 6.8 | 4.5 | 8.5 | 19.8 | 0.55 |
| 8 | 2-ethylhexanol-1 | 5.5 | 92 | 7 | 22.5 | 27.6 | 13.8 | 6.3 | 6.8 | 16 | 29.1 | 0.57 |
| 9 | do | 5.5 | 92 | 6.1 | 28.4 | 28.2 | 14.2 | 6.6 | 7.7 | 8.5 | 8.5 | 0.57 |

Example 4

For purposes of comparison, a run on the polymerization of propylene was carried out under the conditions of Example 1, but with the difference that the catalyst-forming component (b) was a delta $3TiCl_3 \cdot AlCl_3$ which had been treated with 6% by weight of ethylphenylether ($C_6H_5$—O—$C_2H_5$), the ether having been added under the conditions of Example 2. The results obtained are also reported in Table 1.

Examples 5–9

The effect of alcohols on the particle size and bulk density of the polymer was checked in industrial equipment (see Table 2).

In these runs, the alcohol was added, by means of a sprayer to the polymerization catalyst in a 2 mc. homogenizer, equipped with stirrer and cooling jacket.

Example 8 was repeated (see Example 9) in order to check the reproducibility of the results.

Examples 10–12

Example 2 was repeated except that the delta $$3TiCl_3 \cdot AlCl_3$$

used in these examples was treated, under the conditions of Example 2, with the alcohols indicated in Table 3.

What we claim is:

1. A catalyst for the polymerization of olefins and prepared by mixing
   (a) an alkyl aluminum compound selected from the group consisting of $AlR_3$, $R_2AlX$ and $Al_2(C_2H_5)_3Cl_3$, in which R is an alkyl radical containing 2 to 6 carbon atoms and X is halogen,
   (b) a product containing titanium trichloride in the delta crystalline form, said product being obtained by homogenizing from 2 to 10% by weight of an alcoholic compound selected from the group consisting of mono- and polyhydric aliphatic alcohols containing from 1 to 10 carbon atoms and such alcohols containing other functional groups with a preformed delta titanium trichloride prepared by drymilling a substance selected from the group consisting of alpha $TiCl_3$, gamma $TiCl_3$, mixtures of alpha and gamma $TiCl_3$, cocrystallizates of alpha $TiCl_3$ with $AlCl_3$, cocrystallizates of gamma $TiCl_3$ with $AlCl_3$, and cocrystallizates of mixtures of alpha and gamma $TiCl_3$ with $AlCl_3$.

2. Catalysts according to claim 1, characterized in that the delta titanium trichloride used as component (b) contains as a result of contacting thereof with the alcoholic

TABLE 3

| Ex. | Type of alcohol (added) | Percent on the catalyst | Polymerization | | Granulometric distribution of the polymer in microns (Percent by weight) | | | | | | | Percent of powder (≤105 microns) | Apparent density, kg./l. |
|---|---|---|---|---|---|---|---|---|---|---|---|---|---|
| | | | Activity | Isotacticity index | ≥1,000 | ≥420 | ≥177 | ≥105 | ≥74 | ≥53 | ≤53 | | |
| | | | 38 | 91.5 | 12.1 | 18.5 | 20.3 | 18.3 | 13.2 | 14 | 8.6 | 32.8 | 0.48 |
| 10 | Ethylene glycol | 6 | 34 | 93.5 | 14.5 | 24.1 | 28.8 | 12.4 | 6.4 | 5.5 | 8.3 | 20.2 | 0.49 |
| 11 | Ethylene glycol monophenylether | 6 | 43 | 94.5 | 14.8 | 23.2 | 26.6 | 13.4 | 7.8 | 11.9 | 2.3 | 22 | 0.49 |
| 12 | Pentaerythritol | 6 | 39 | 92.5 | 15 | 24.9 | 27.2 | 12.1 | 7 | 8.8 | 5 | 20.8 | 0.50 |

$$(HOCH_2-\underset{\underset{CH_2OH}{|}}{\overset{\overset{CH_2OH}{|}}{C}}-CH_2OH)$$

[1] The catalytic activity is expressed in g. polymer/g. $3TiCl_3 \cdot AlCl_3$ hr. ata. $C_3^-$.

Examples 13–15

The $3TiCl_3 \cdot AlCl_3$ used in these examples was treated with the alcohols indicated in Table 4.

The polymerization conditions were the same as in Example 2. The titanium trichloride used in Example 15 was obtained by dry milling in a Locke mill for 3.5 hours an alpha and gamma $3TiCl_3 \cdot AlCl_3$ mixture to which 6% by weight of 2-ethylhexanol-1 was added.

compound, at least 20% less of particles having a size smaller than 20 microns than are normally present therein.

3. Catalysts according to claim 1, further characterized in that the alcohol is selected from the group consisting of butanol-1, propanol-2, and 2-ethyl-hexanol-1.

4. Catalysts according to claim 1, further characterized in that the alcohol is selected from the group consisting of glycerin, pentaerythritol, and ethylene glycol.

TABLE 4

| Ex. | Type of alcohol added | Percent on the catalyst | Polymerization | | Granulometric distribution of the polymer in microns (Percent by weight) | | | | | | | Percent of powder (<105 microns) | Apparent density, kg./l. |
|---|---|---|---|---|---|---|---|---|---|---|---|---|---|
| | | | Activity [1] | Isotacticity index | ≥1,000 | ≥420 | ≥177 | ≥105 | ≥74 | ≥53 | ≤53 | | |
| 13 | Methanol | 3 | 20 | 94 | 20.5 | 32.3 | 23.9 | 11.2 | 5.4 | 4 | 2.7 | 12.1 | 0.46 |
| 14 | Diisopropylbenzenediol | 6 | 43 | 93.5 | 11.3 | 23.8 | 31.1 | 13.2 | 8.3 | 7.5 | 4.8 | 20.6 | 0.54 |

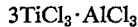

| 15 | 2-ethyl-hexanol-1 | 6 | 45 | 93.1 | 10.5 | 25.1 | 27.3 | 14.6 | 10.2 | 8.5 | 3.8 | 22.5 | 0.46 |

[1] Catalytic activity expressed in g. polymer/g. $3TiCl_3 \cdot AlCl_3$ hr. ata. $C_3^-$.

5. Catalysts according to claim 1, further characterized in that the alcoholic compound is selected from the group consisting of glycolmonoalkyl ethers and glycolmonoaryl ethers.

6. Catalysts according to claim 1, characterized in that component (b) is the product obtained by contacting the delta titanium trichloride with the alcoholic compound in the absence of a solvent.

7. Catalysts according to claim 1, characterized in that component (b) is the product obtained by contacting the alcoholic compound with the delta titanium trichloride suspended in an inert hydrocarbon solvent.

8. Catalysts according to claim 1, characterized in that component (b) is the product obtained by contacting the alcoholic compound with $3TiCl_3 \cdot AlCl_3$ obtained by reducing titanium tetrachloride with aluminum, and then transforming the reduction product into $3TiCl_3 \cdot AlCl_3$ in which the titanium trichloride is in the delta form, by dry-milling.

9. Catalysts according to claim 1, characterized in that component (a) is a dialkylaluminum halide.

10. The process for the polymerization of higher alpha-olefins, which process comprises contacting the higher alpha-olefin with a catalyst as defined in claim 1.

11. The process according to claim 10, characterized in that the higher alpha-olefin is propylene.

12. The process according to claim 10, characterized in that the higher alpha-olefin is butene-1.

13. The proces according to claim 10, characterized in that the higher alpha-olefin is 4-methylpentene-1.

References Cited
UNITED STATES PATENTS

| | | | |
|---|---|---|---|
| 3,530,107 | 9/1970 | Yoshioka et al. | 260—94.9 |
| 3,560,146 | 2/1971 | Luciani et al. | 260—94.9 |
| 3,130,005 | 4/1964 | Siggel et al. | 260—94.9 B |
| 3,701,763 | 10/1972 | Wada et al. | 260—94.9 C |

JOSEPH L. SCHOFER, Primary Examiner

EDWARD J. SMITH, Assistant Examiner

U.S. Cl. X.R.

252—429 B, 429 C; 260—94.9 C, 94.9 E

UNITED STATES PATENT OFFICE
CERTIFICATE OF CORRECTION

Patent No. 3,793,295          Dated February 19, 1974

Inventor(s) Luciano LUCIANI et al

It is certified that error appears in the above-identified patent and that said Letters Patent are hereby corrected as shown below:

Col. 5, line 5, " Ti Cl " should be - - - Ti Cl$_3$ - - -.

Cols. 5 and 6, Table 2, under the heading " $\geq$ 177, " the last item " 28.2 " should be - - - 28.5 - - -.

Cols. 5 and 6, Table 2, the heading "Percent in in powder ($\leq$ 105 microns)" should be - - - Percent in powder ($\leq$ 105 microns ) - - -;

last item under that heading, " 8.5 " should be - - - 22.8 - -.

Col. 6, Claim 1, line 6, the word - - - with - - - should appear after " halogen, ".

Signed and sealed this 31st day of December 1974.

(SEAL)
Attest:

McCOY M. GIBSON JR.
Attesting Officer

C. MARSHALL DANN
Commissioner of Patents